US006852419B2

(12) United States Patent
Stachowiak

(10) Patent No.: US 6,852,419 B2
(45) Date of Patent: Feb. 8, 2005

(54) HEAT TREATABLE COATED ARTICLE WITH NIOBIUM CHROMIUM NITRIDE IR REFLECTING LAYER AND METHOD OF MAKING SAME

(75) Inventor: Grzegorz Stachowiak, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 10/370,060

(22) Filed: Feb. 21, 2003

(65) Prior Publication Data

US 2004/0166328 A1 Aug. 26, 2004

(51) Int. Cl.$^7$ .............................. B32B 17/00; B32B 7/00
(52) U.S. Cl. ..................... 428/432; 428/428; 428/433; 428/698; 428/699; 428/704; 428/34
(58) Field of Search .................... 428/34, 410, 428, 428/432, 433, 431, 689, 697, 698, 699, 704

(56) References Cited

U.S. PATENT DOCUMENTS

| | | |
|---|---|---|
| 3,597,050 A | 8/1971 | Plumat |
| 5,407,733 A | 4/1995 | Bjornard et al. |
| 5,425,861 A | 6/1995 | Hartig et al. |
| 5,543,229 A | 8/1996 | Ohsaki et al. |
| 5,688,585 A | 11/1997 | Lingle et al. |
| 5,837,361 A | 11/1998 | Glaser et al. |
| 5,935,702 A | 8/1999 | Macquart et al. |
| 5,948,538 A | 9/1999 | Brochot et al. |
| 6,030,671 A * | 2/2000 | Yang et al. .................. 428/34 |
| 6,059,909 A | 5/2000 | Hartig et al. |
| 6,355,334 B1 | 3/2002 | Rondeau et al. |
| 6,475,626 B1 | 11/2002 | Stachowiak |
| 6,495,263 B2 | 12/2002 | Stachowiak |
| 6,514,621 B1 | 2/2003 | Marietti et al. |
| 6,558,800 B1 | 5/2003 | Stachowiak |
| 6,576,349 B2 | 6/2003 | Lingle et al. |
| 2002/0192473 A1 * | 12/2002 | Gentilhomme et al. ..... 428/432 |

FOREIGN PATENT DOCUMENTS

| | | |
|---|---|---|
| WO | WO 01/21540 | 3/2001 |
| WO | WO 02/090281 | 11/2002 |

OTHER PUBLICATIONS

"Heat Insulated Glass Which Can Be Thermally Worked", Hironobu, 05124839, Oct. 1991.

* cited by examiner

Primary Examiner—Deborah Jones
Assistant Examiner—G. Blackwell-Rudasill
(74) Attorney, Agent, or Firm—Nixon & Vanderhye P.C.

(57) ABSTRACT

A coated article is provided so as to include a solar control coating having an infrared (IR) reflecting layer sandwiched between at least a pair of dielectric layers. The IR reflecting layer includes NbCr and/or NbCrN$_x$ in certain embodiments of this invention. The use of such materials as an IR reflecting layer(s) enables the coated article to have good corrosion resistance to alkaline solutions, good mechanical performance such as scratch resistance, and/or good color stability (i.e., a low ΔE* value(s)) upon heat treatment (HT). The coated article may be heat treated (e.g., thermally tempered) in certain example embodiments of the invention.

45 Claims, 5 Drawing Sheets

NaOH boil test

NaOH boil test glass/NbCr

HEAT TREATABLE COATED ARTICLE WITH NIOBIUM CHROMIUM NITRIDE IR REFLECTING LAYER AND METHOD OF MAKING SAME

This invention relates to coated articles that include at least one niobium chromium (NbCr) and/or niobium chromium nitride (NbCrN$_x$) infrared (IR) reflecting layer sandwiched between at least a pair of dielectric layers, and/or a method of making the same. Such coated articles may be used in the context of monolithic windows, insulating glass (IG) window units, laminated windows, and/or other suitable applications.

BACKGROUND AND SUMMARY OF THE INVENTION

Solar control coatings having a layer stack of glass/Si$_3$N$_4$/NiCr/Si$_3$N$_4$ are known in the art, where the metallic NiCr layer is the sole infrared (IR) reflecting layer in the coating. In certain instances, the NiCr layer may be nitrided.

Unfortunately, while such layer stacks with NiCr IR reflecting layers provide efficient solar control and are overall good coatings, they sometimes are lacking in terms of: (a) corrosion resistance to acid (e.g., HCl boil); (b) mechanical performance such as scratch resistance; and/or (c) thermal stability upon heat treatment for tempering, heat bending, or the like (i.e., ΔE* value(s)). For example, a known heat treatable coated article having a layer stack of glass/Si$_3$N$_4$/NiCr/Si$_3$N$_4$ has an undesirably high glass side reflective ΔE* value of above 5.0 after heat treatment (HT) at 625 degrees C. for about ten minutes. This high glass side reflective ΔE* value means that the coated article when HT will not approximately match its non-HT counterpart with respect to glass side reflective color.

Accordingly, there exists a need in the art for a coated article that has improved characteristics with respect to (a), (b) and/or (c) compared to a conventional layer stack of glass/Si$_3$N$_4$/NiCr/Si$_3$N$_4$, but which still is capable of acceptable solar control (e.g., blocking a reasonable amount of IR and/or UV radiation) and/or heat treatment. It is a purpose of this invention to fulfill at least one of the above-listed needs, and/or other needs which will become apparent to the skilled artisan once given the following disclosure.

A recent development by the instant inventor (which is not prior art to the instant application), set forth in U.S. patent application Ser. No. 10/338,878, filed Jan. 9, 2003 (hereby incorporated herein by reference), is the use of a layer stack of glass/Si$_3$N$_4$/NbN$_x$/Si$_3$N$_4$, where the NbN$_x$ is used as the IR reflecting layer. This layer stack is advantageous with respect to the aforesaid glass/Si$_3$N$_4$/NiCr/Si$_3$N$_4$ layer stack in that coated articles with the NbN$_x$ IR reflecting layer realize improved color stability upon heat treatment (i.e., lower ΔE* values) and/or improved durability.

While coated articles having a layer stack of glass/Si$_3$N$_4$/NbN$_x$/Si$_3$N$_4$ represent improvements in the art, they are sometimes lacking with respect to durability. For example, they sometimes suffer damage when exposed to certain chemicals such as alkaline solutions, e.g., upon exposure to a one hour NaOH boil test for measuring durability.

FIGS. 2–3 illustrate that coatings including sputter coated layer stacks of glass/Si$_3$N$_4$/Nb/Si$_3$N$_4$ (FIG. 2) and glass/Si$_3$N$_4$/NbN$_x$/Si$_3$N$_4$ (FIG. 3) are often damaged by the one hour NaOH boil test (one hour boil in solution including about 0.1 normal NaOH solution—0.4% NaOH mixed with water—at about 195 degrees F.). For the boil test, see ASTM D 1308-87, incorporated herein by reference.

In FIG. 2, there are six samples illustrated, three in the top row and three in the bottom row (all including a metallic Nb layer). The three top row samples were tested in the NaOH boil as coated on a glass substrate (no heat treatment), whereas the three bottom row samples were tested in the NaOH boil only after they were heat treated (HT) in an oven at about 450 degrees C. for 10 minutes. The two samples in the first column (left-most column) had a layer stack of glass/Nb, the two samples in the middle column had a layer stack of glass/Si$_3$N$_4$/Nb (silicon nitride layer is about 50 Å thick), and the two samples in the third column (right-most column) had a layer stack of glass/Si$_3$N$_4$/Nb/Si$_3$N$_4$ (silicon nitride layers each about 50 Å thick). The lower half of each of the six samples was dipped in the NaOH boil, while the top half was not. It can be seen from FIG. 2 that the NaOH boil test severely damaged all six samples which included the metallic Nb layer, even when the metallic layer was covered by a layer of silicon nitride. Thus, it can be seen that coatings with metallic Nb layers are susceptible to damage when exposed to certain chemicals as illustrated by the damage caused by the NaOH boil test shown in FIG. 2.

FIG. 3 is provided for illustrating the results of the same one hour NaOH boil test carried out on layer stacks including a NbN$_x$ layer. In FIG. 3, there are six samples illustrated, three in the top row and three in the bottom row (none were heat treated). The three samples in the top row included a NbN$_x$ layer sputter-deposited with 8 sccm nitrogen gas flow (using a Nb target), while the three samples in the bottom row included a NbN$_x$ layer sputter-deposited with 10 sccm nitrogen gas flow (using the same Nb target). The two samples in the first column (left-most column) of FIG. 3 had a layer stack of glass/NbN$_x$, the two samples in the middle column had a layer stack of glass/Si$_3$N$_4$/NbN$_x$, and the two samples in the third column (right-most column) had a layer stack of glass/Si$_3$N$_4$/NbN$_x$/Si$_3$N$_4$ (silicon nitride layers each about 50 Å thick). The lower half of each sample was dipped in the NaOH boil, while the top half was not. Since none of these samples were heat treated, they should be compared to the upper row samples from FIG. 2.

Referring to FIG. 3, although the damage was not as severe as in FIG. 2, all six NbN$_x$ samples in FIG. 3 were visibly damaged due to the NaOH boil test (even those with a protective silicon nitride layer over the Nb nitride layer), while the three bottom row samples and the two left-most upper row samples were the most severely damaged. Thus, it can be seen that coatings with NbN$_x$ layers are susceptible to damage when exposed to certain chemicals as illustrated by the damage caused by the NaOH boil test shown in FIG. 3.

Thus, it will be apparent that there exists a need in the art for coated articles which are capable of achieving acceptable solar control performance, and which are also durable upon exposure to certain chemicals (e.g., NaOH boil test).

In certain example embodiments of this invention, a coating or layer system is provided which includes an infrared (IR) reflecting layer comprising niobium chromium (NbCr) and/or niobium chromium nitride (NbCrN$_x$) sandwiched between at least a pair of dielectric layers. In other words, amount(s) of chromium (Cr) are added to the coatings of FIGS. 2–3 according to different embodiments of this invention. Surprisingly, it has been found that the addition of Cr to the coatings of FIGS. 2–3 enables the resulting coated articles to achieve improved corrosion resistance to alkaline solutions such as NaOH, good mechanical performance such as scratch resistance, and/or good color stability (i.e., a low ΔE* value(s)) upon heat treatment (HT) in certain example instances.

Due to its spectral selectivity, niobium chromium (NbCr) and niobium chromium nitride (NbCrN$_x$) provide thermal performance (e.g., IR blocking) similar to NiCr and NbN$_x$, but are surprisingly more durable (e.g., chemically durable) than both NiCr and NbN$_x$. The use of NbCr and/or NbCrN$_x$ in an IR reflecting layer surprisingly results in a solar control coating having excellent scratch resistance, and very good resistance to alkaline solutions such as HCl and/or NaOH. Moreover, it has surprisingly been found that in certain example instances the use of NbCr and/or NbCrN$_x$ in/as an IR reflecting layer enables the solar control coating to have significantly improved color stability upon HT (e.g., a lower ΔE* value with a given HT time) than the aforesaid conventional coating where metallic NiCr is used as the IR reflecting layer.

A coated article according to an example embodiment of this invention utilizes such a NbCr and/or NbCrN$_x$ layer(s) sandwiched between at least a pair of dielectric layers of a material(s) such as silicon nitride or the like. In certain example embodiments of this invention, the NbCr and/or NbCrN$_x$ layer is not in contact with any metallic IR reflecting layer (e.g., is not in contact with any Ag or Au layer).

In certain example embodiments of this invention, heat treated (HT) coated articles including a NbCr and/or NbCrN$_x$ inclusive IR reflecting layer(s) have a glass side reflective ΔE* value due to heat treatment of no greater than 3.0, more preferably no greater than 2.5, even more preferably no greater than 2.0, and most preferably no greater than 1.8. For purposes of example, the heat treatment (HT) may be for at least about 5 minutes at a temperature(s) of at least about 580 degrees C.

In certain example embodiments of this invention, the Nb:Cr ratio in the NbCr and/or NbCrN$_x$ inclusive IR reflecting layer(s) may be from about 0.75 to 50.0 (i.e., there may be from about 0.75 to 50.0 times as much Nb in the layer compared to Cr in the layer, with respect to atomic %). In certain example embodiments, the layer comprising NbCr (nitrided or not) may include from about 1–70 atomic % Cr, more preferably from about 1–30 atomic % Cr, and most preferably from about 3–20 atomic % Cr.

Generally speaking, certain example embodiments of this invention fulfill one or more of the above listed needs by providing a coated article including a coating supported by a glass substrate, the coating comprising: a first dielectric layer; a layer comprising NbCr and/or a nitride of NbCr; a second dielectric layer, wherein said layer comprising NbCr and/or a nitride of NbCr is located between at least the first and second dielectric layers; and wherein said layer comprising NbCr and/or a nitride of NbCr does not contact any metallic infrared (IR) reflecting layer of Ag.

IN THE DRAWINGS

Figure 4:
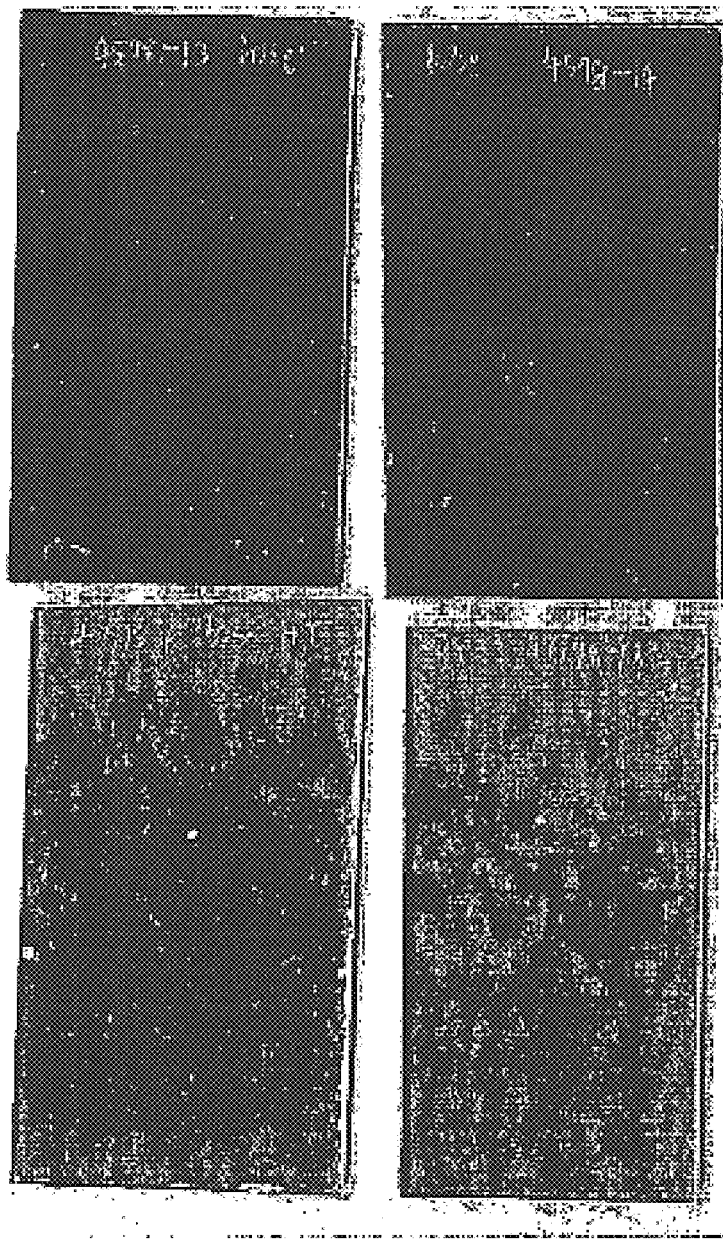

FIG. 4 illustrates photographs of top surfaces of four samples (the bottom pair heat treated and the top pair not heat treated) of coated articles having a layer stack of glass/NbCrN$_x$ (left-hand column) or glass/Si$_3$N$_4$/NbCrN$_x$ (right-hand column), not even covered with silicon nitride, according to an example embodiment of this invention, after being subjected to the one hour NaOH boil test.

Figure 5:
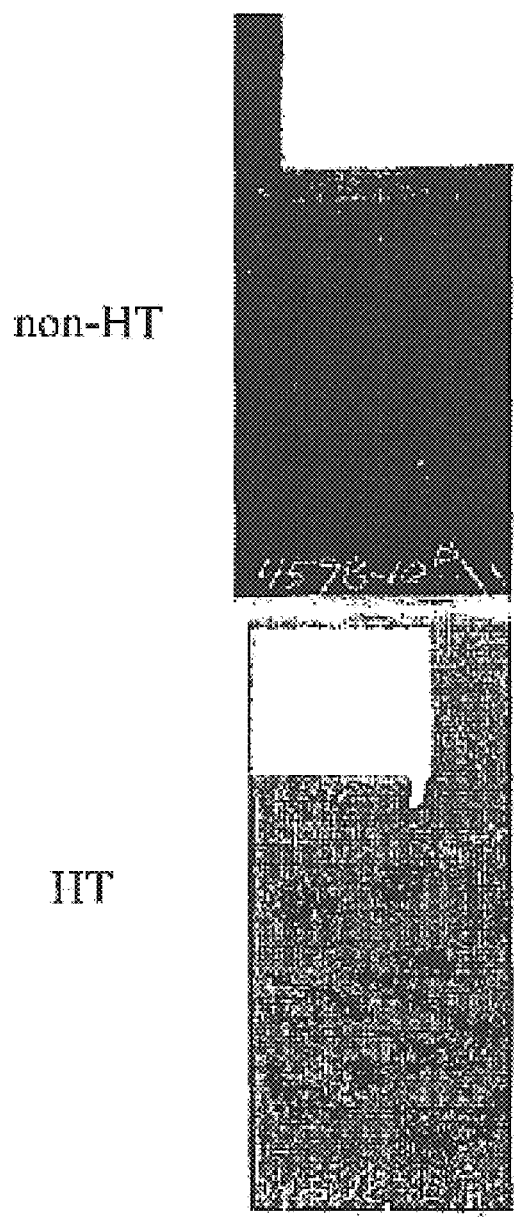

FIG. 5 illustrates photographs of top surfaces of two samples (one heat treated and the other not heat treated) of coated articles having a layer stack of glass/NbCr according to an example embodiment of this invention, after being subjected to the one hour NaOH boil test.

DETAILED DESCRIPTION OF CERTAIN EXAMPLE EMBODIMENTS OF THE INVENTION

Certain embodiments of this invention provide a coating or layer system that may be used in windows such as monolithic windows (e.g., vehicle, residential, and/or architectural windows), IG window units, and/or other suitable applications. Certain example embodiments of this invention provide a layer system that is characterized by good (a) corrosion resistance to acids, and alkaline solutions such as NaOH (e.g., which can be tested via an NaOH boil test as shown in the figures); (b) mechanical performance such as scratch resistance; and/or (c) color stability upon heat treatment. With respect to stability upon heat treatment (HT), this means a low value of ΔE*; where A is indicative of a*, b* and L* change in view of HT such as thermal tempering, heat bending, or thermal heat strengthening, monolithically and/or in the context of dual pane environments such as IG units or laminates.

Figure 1:
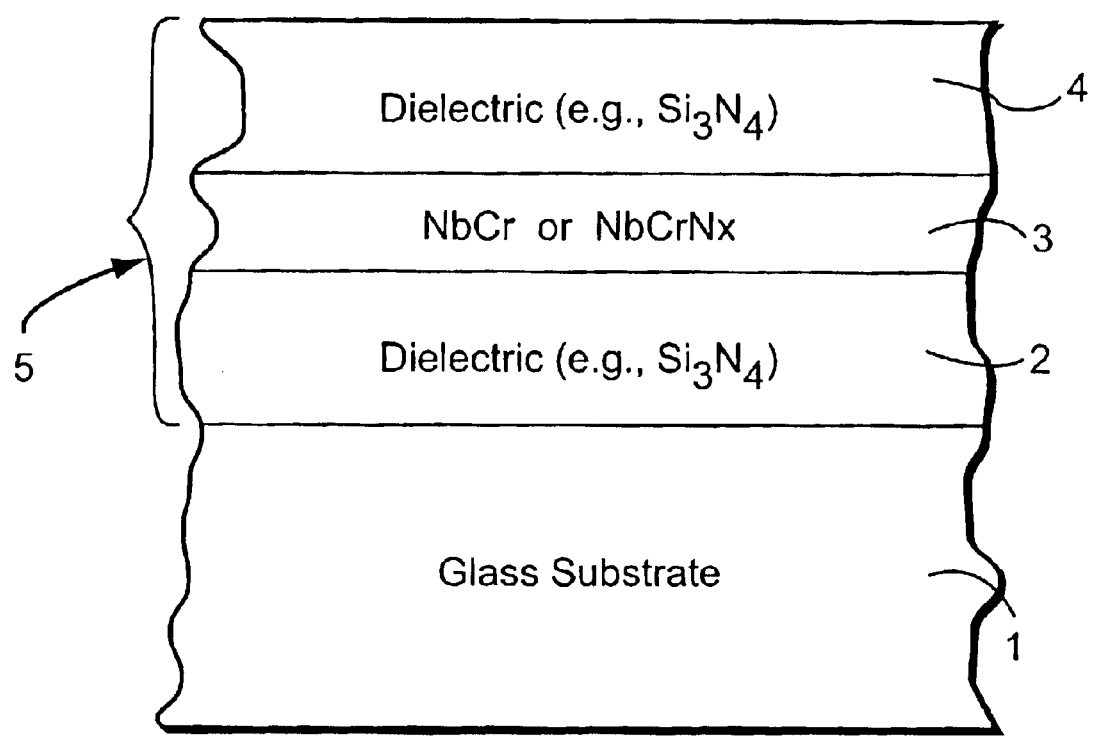
FIG. 1 is a partial cross sectional view of an embodiment of a monolithic coated article (heat treated or not heat treated) according to an example embodiment of this invention.

FIG. 1 is a side cross sectional view of a coated article according to an example embodiment of this invention. The coated article includes at least substrate 1 (e.g., clear, green, bronze, grey, blue, or blue-green glass substrate from about 1.0 to 12.0 mm thick), first optional dielectric layer 2 (e.g., of or including silicon nitride (e.g., Si$_3$N$_4$), tin oxide, or some other suitable dielectric), infrared (IR) reflecting layer 3 of or including niobium chromium (NbCr) and/or a nitride of niobium chromium (NbCrN$_x$), and second dielectric layer 4 (e.g., of or including silicon nitride (e.g., Si$_3$N$_4$), tin oxide, or some other suitable dielectric). In certain example embodiments of this invention, coating 5 does not include any metallic IR blocking or reflecting layer of Ag or Au. In such embodiments, NbCr and/or NbCrN$_x$ IR reflecting layer (s) 3 may be the only IR reflecting layer in coating 5. In certain example embodiments of this invention, NbCr and/or NbCrN$_x$ IR reflecting layer 3 reflects at least some IR radiation, and does not contact any other metal IR reflecting layer (e.g., the IR reflecting layer 3 comprising NbCr and/or NbCrN$_x$ does not contact any Ag or Au layer). In certain example embodiments, it is possible for the NbCr and/or NbCrN$_x$ layer 3 to include other materials such as dopants.

Overall coating 5 includes at least layers 2–4. It is noted that the terms "oxide" and "nitride" as used herein include various stoichiometries. For example, the term silicon nitride includes stoichiometric Si$_3$N$_4$, as well as non-stoichiometric silicon nitride. Layers 2–4 may be deposited on substrate 1 via magnetron sputtering, any other type of sputtering, or via any other suitable technique in different embodiments of this invention.

In certain example embodiments of this invention, IR reflecting layer 3 is sputter-deposited so as to be of, or include, NbCr and/or NbCrN$_x$. In certain example embodiments of this invention, the Nb:Cr ratio in the NbCr and/or NbCrN$_x$ inclusive IR reflecting layer(s) may be from about 0.75 to 50.0 (i.e., there may be from about 0.75 to 50.0 times as much Nb in the layer compared to Cr in the layer, with respect to atomic %). In certain example embodiments, the layer comprising NbCr (nitrided or not) may include from about 1–70 atomic % Cr, more preferably from about 1–30 atomic % Cr, and most preferably from about 3–20 atomic % Cr. It has surprisingly been found that the best thermal performance is achieved at low Cr amounts, but that Cr was especially needed for durability. For example, durability is excellent at about 20% Cr. At 10% Cr, durability was still good, but below about 10% resistance to alkaline solutions decreases with Cr %, but was still visibly better than Nb or NbN down to about 1–2% of Cr content. However, stability upon HT may improve as Cr content increases. Thus, it can be seen that NbCr alloys herein are advantageous in many respects, regardless of whether or not they are nitrided or the like. These ranges are provided for purposes of example only.

In embodiments where the IR reflecting layer 3 is of or includes $NbCrN_x$ (i.e., a nitride of NbCr), the ratio in the layer of nitrogen to the total combination of Nb and Cr may be represented, in certain example embodiments, by $(Nb+Cr)_xN_y$, where the ratio y/x (i.e., the ratio of N to Nb+Cr) is from 0.2 to 0.9, even more preferably from 0.3 to 0.8, still more preferably from 0.4 to 0.7. It has been found that the aforesaid y/x ratio ranges for nitrides of NbCr are particularly beneficial.

While FIG. 1 illustrates coating 5 in a manner where NbCr and/or $NbCrN_x$ layer 3 is in direct contact with dielectric layers 2 and 4, and wherein layer 3 is the only IR reflecting layer in the coating, the instant invention is not so limited. Other layer(s) may be provided between layers 2 and 3 (and/or between layers 3 and 4) in certain other embodiments of this invention. Moreover, other layer(s) may be provided between substrate 1 and layer 2 in certain embodiments of this invention; and/or other layer(s) may be provided on substrate 1 over layer 4 in certain embodiments of this invention. Thus, while the coating 5 or layers thereof is/are "on" or "supported by" substrate 1 (directly or indirectly), other layer(s) may be provided therebetween. Thus, for example, the layer system 5 and layers thereof shown in FIG. 1 are considered "on" the substrate 1 even when other layer(s) may be provided therebetween (i.e., the terms "on" and "supported by" as used herein are not limited to directly contacting). Also, more than one NbCr and/or $NbCrN_x$ IR reflecting layer may be provided in alternative embodiments of this invention.

As explained above, it has surprisingly been found that the use of NbCr and/or $NbCrN_x$ (as opposed to only Nb, $NbN_x$, and/or NiCr) results in a coated article having: (a) improved corrosion resistance with respect to alkaline solutions such as NaOH; (b) improved mechanical performance such as better scratch resistance; and/or (c) improved color stability (i.e., lower $\Delta E^*$ value(s)) in the context of a heat treatable coating.

FIG. 4 illustrates photographs of a pair of HT coated articles (top pair) and a pair of non-HT coated articles (bottom pair) according to an example embodiment of this invention where the NbCr is nitrided to some extent (12 sccm N flow). Each of the samples in the right-hand column of FIG. 4 had a layer stack of glass/$NbCrN_x$ while each of the samples in the right-hand column of FIG. 4 had a layer stack of glass/$Si_3N_4$/$NbCrN_x$, where the silicon nitride layer was about 50 Å thick. The top samples in FIG. 4 were not heat treated, while the bottom samples were heat treated in an oven at about 450 degrees C. for about 10 minutes. The bottom half of each sample was subjected to the one hour NaOH boil test described above, while the top half of each sample was not.

Figure 2:
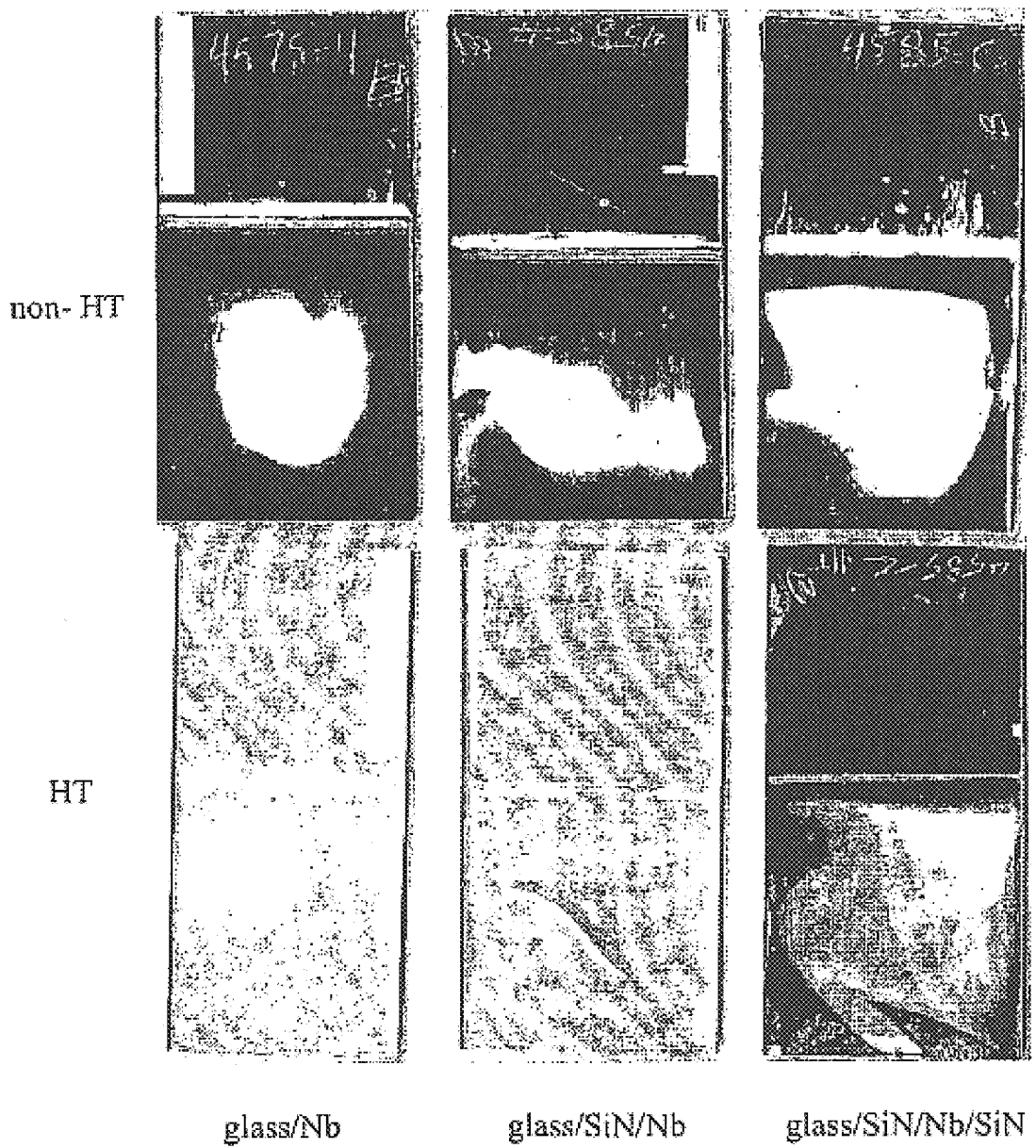
FIG. 2 illustrates photographs of top surfaces of six samples which utilize at least a layer of metallic Nb, after being subjected to a one hour NaOH boil test.
Figure 3:
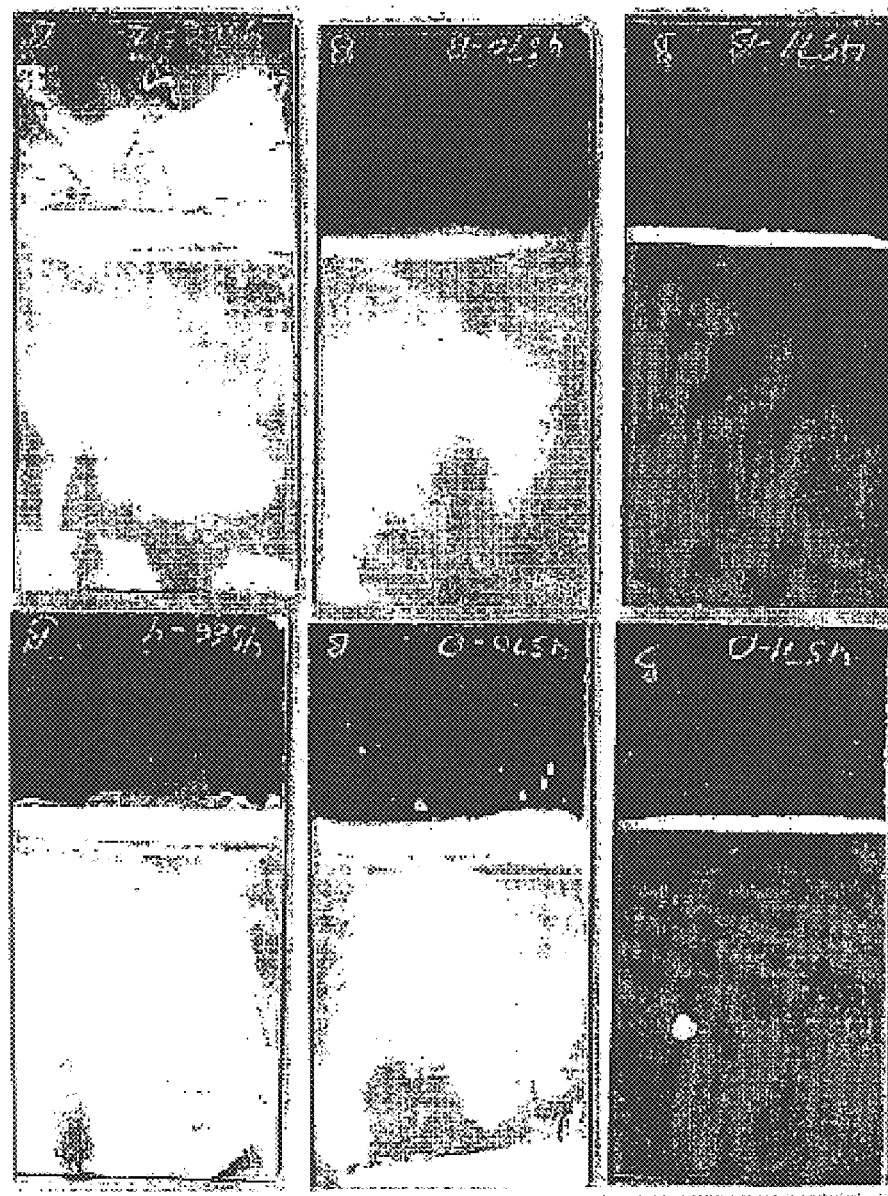
FIG. 3 illustrates photographs of top surfaces of six samples which utilize at least a layer of niobium nitride (NbN$_x$), after being subjected to a one hour NaOH boil test.

By comparing FIG. 4 with FIGS. 2–3, it can be seen that the resistance to oxidation and alkaline solutions (e.g., NaOH) improves dramatically when Cr is added to an Nb inclusive IR reflecting layer so as to form a layer comprising $NbCrN_x$ (as opposed to Nb as in FIG. 2, or $NbN_x$ as in FIG. 3). In fact, the exposed $NbCrN_x$ layers in FIG. 4 (the $NbCrN_x$ layers in FIG. 4 were not even covered with silicon nitride) were less damaged by the NaOH boil than were both (a) the exposed Nb and $NbN_x$ layers in the respective left and middle columns of FIGS. 2–3, and (b) the silicon nitride covered Nb and $NbN_x$ layers in the respective right-hand columns of FIGS. 2–3. This illustrates dramatic improvement in chemical durability.

Moreover, it is noted that in FIG. 4 it is difficult to visually observe any significant difference between the lower portion of each sample which was dipped in the NaOH boil, and the upper portion of each sample which was not dipped in the NaOH boil. Again, this illustrates that the NaOH boil test did not damage the $NbCrN_x$ layers shown in FIG. 4, even though these layers were not even covered with a protective layer such as silicon nitride.

The slight color difference between the top and bottom samples in FIG. 4 is irrelevant. In particular, the lighter color for the bottom samples (compared to the top samples in FIG. 4) was a result of heat treating the sample when the $NbCrN_x$ layer was exposed and not protected by a silicon nitride overcoat. In many commercial applications, the $NbCrN_x$ layer will be so protected with at least one overcoat as shown in FIG. 1 (e.g., see protective layer 4 in FIG. 1), so that the lighter color shown for the bottom sample in FIG. 4 will not occur.

FIG. 5 illustrates photographs of a pair of coated articles according to another example embodiment of this invention. Each of the samples in FIG. 5 had a layer stack including a top exposed layer of NbCr deposited directly on a glass substrate. The white areas in the upper right-hand corners of the two samples are areas which were left uncoated. The top sample in FIG. 5 was not heat treated, while the bottom sample was heat treated in an oven at about 450 degrees C. for about 10 minutes. The bottom half of each sample was subjected to the one hour, NaOH boil test described above, while the top half of each sample was not.

By comparing FIG. 5 with FIGS. 2–3, it can be seen that the resistance to alkaline solutions (e.g., NaOH) improves dramatically when Cr is added to an Nb inclusive IR reflecting layer so as to form a layer comprising NbCr (as opposed to Nb as in FIG. 2). In fact, the exposed NbCr layers in FIG. 5 (the NbCr layers in FIG. 5 were not even covered with silicon nitride) were less damaged by the NaOH boil than were both (a) the exposed Nb and $NbN_x$ layers in the respective left and middle columns of FIGS. 2–3, and (b) the silicon nitride covered Nb and $NbN_x$ layers in the respective right-hand columns of FIGS. 2–3. This illustrates dramatic improvement in chemical durability.

Moreover, it is noted that in FIG. 5 it is difficult to visually observe any significant difference between the lower portion of each sample which was dipped in the NaOH boil, and the upper portion of each sample which was not dipped in the NaOH boil. Again, this illustrates that the NaOH boil test did not damage the metallic NbCr layers shown in FIG. 5, even though these layers were not even covered with a protective layer such as silicon nitride.

As with FIG. 4, the slight color difference between the top and bottom samples in FIG. 5 is irrelevant. As explained above, the lighter color for the bottom sample was a result of heat treating the sample when the NbCr layer was exposed and not protected by a silicon nitride or other suitable overcoat. In commercial applications, the NbCr layer may be so protected with at least one overcoat (e.g., see protective layer 4 in FIG. 1), so that the oxidation shown for the bottom sample in FIG. 5 will not occur.

In certain example embodiments of this invention, dielectric anti-reflection layer 2 may have an index of refraction "n" of from 1.7 to 2.7, more preferably from 1.9 to 2.5 in certain embodiments, while layer 4 may have an index of refraction "n" of from about 1.5 to 2.5, more preferably from 1.9 to 2.3. Meanwhile, layer 3 may have an index "n" of from about 1.5 to 2.5, more preferably from 1.7 to 2.3. In embodiments of this invention where layers 2 and/or 4 comprise silicon nitride (e.g., $Si_3N_4$), sputtering targets including Si employed to form these layers may or may not be admixed with up to 1–40% by weight aluminum or stainless steel (e.g. SS#316), with about this amount then appearing in the layers so formed. Even with this amount(s) of aluminum and/or stainless steel, such layers 2 and 4 are still considered dielectric layers herein.

While FIG. 1 illustrates a coated article according to an embodiment of this invention in monolithic form, coated articles according to other embodiments of this invention may comprise IG (insulating glass) window units. In IG embodiments, coating 5 from FIG. 1 may be provided on the inner wall of the outer substrate of the IG unit, and/or on the inner wall of the inner substrate, or in any other suitable location in other embodiments of this invention.

Turning back to FIG. 1, while various thicknesses may be used consistent with one or more of the needs discussed herein. According to certain non-limiting example embodiments of this invention, example thicknesses and materials for the respective layers 2–4 on the glass substrate 1 are as follows:

TABLE 1

(Example non-limiting thicknesses)

| Layer | Example Range (Å) | Preferred (Å) | Best (Å) |
| --- | --- | --- | --- |
| silicon nitride (layer 2): | 0–1,500 Å | 20–1300 Å | 100–120 Å |
| NbCr or $NbCrN_x$ (layer 3): | 50–700 Å | 100–500 Å | 150–350 Å |
| silicon nitride (layer 4): | 10–900 Å | 100–800 Å | 200–500 Å |

In certain exemplary embodiments, the color stability with HT may result in substantial matchability between heat-treated and non-heat treated versions of the coating or layer system. In other words, in monolithic and/or IG applications, in certain embodiments of this invention two glass substrates having the same coating system thereon (one HT after deposition and the other not HT) appear to the naked human eye to look substantially the same.

The value(s) $\Delta E^*$ is important in determining whether or not there is matchability, or substantial color matchability upon HT, in the context of certain embodiments of this invention (i.e., the term $\Delta E^*$ is important in determining color stability upon HT). Color herein is described by reference to the conventional $a^*, b^*$ values. For example, the term $\Delta a^*$ is indicative of how much color value $a^*$ changes due to HT. The term $\Delta E^*$ (and $\Delta E$) is well understood in the art. The definition of the term $\Delta E^*$ may be found, for example, in WO 02/090281 and/or U.S. Pat. No. 6,475,626, the disclosures of which are hereby incorporated herein by reference. In particular, $\Delta E^*$ corresponds to the CIE LAB Scale $L^*, a^*, b^*$, and is represented by:

$$\Delta E^* = \{(\Delta L^*)^2 + (\Delta a^*)^2 + (\Delta b^*)^2\}^{1/2} \quad (1)$$

where:

$$\Delta L^* = L^*_1 - L^*_o \quad (2)$$

$$\Delta a^* = a^*_1 - a^*_o \quad (3)$$

$$\Delta b^* = b^*_1 - b^*_o \quad (4)$$

where the subscript "o" represents the coating (or coated article) before heat treatment and the subscript "1" represents the coating (or coated article) after heat treatment; and the numbers employed (e.g., $a^*, b^*, L^*$) are those calculated by the aforesaid (CIE LAB 1976) $L^*, a^*, b^*$ coordinate technique. In a similar manner, $\Delta E^*$ may be calculated using equation (1) by replacing $a^*, b^*, L^*$ with Hunter Lab values $a_h, b_h, L_h$. Also within the scope of this invention and the quantification of $\Delta E^*$ are the equivalent numbers if converted to those calculated by any other technique employing the same concept of $\Delta E^*$ as defined above.

Before heat treatment (HT) such as thermal tempering, in certain example embodiments of this invention coated articles have color characteristics as follows in Table 2 (monolithic and/or IG unit). It is noted that subscript "G" stands for glass side reflective color, subscript "T" stands for transmissive color, and subscript "F" stands for film side color. As is known in the art, glass side (G) means reflective color when viewed from the glass side (as opposed to the layer/film side) of the coated article. Film side (F) means reflective color when viewed from the side of the coated article on which the coating 5 is provided. Table 3 set forth below illustrates certain characteristics of coated articles according to certain example embodiments of this invention after HT such as thermal tempering (monolithic and/or IG units)—the characteristics below in Table 2 (non-HT) are also applicable to HT coated articles herein, except for the additions set forth in Table 3.

TABLE 2

Color/Optical Characteristics (non-HT)

| | General | Preferred | Most Preferred |
| --- | --- | --- | --- |
| $T_{vis}$ (TY): | 8–80% | 10–50% | 12–30% |
| $L^*_T$ | 34–92 | 37–76 | 41–62 |
| $a^*_T$ | −6 to +6 | −4 to +3 | −3 to +2 |
| $b^*_T$ | −20 to +20 | −15 to +10 | −10 to +10 |
| $R_G Y$ (glass side): | 8–50% | 10–40% | 12–30% |
| $L^*_G$ | 34–76 | 37–70 | 41–62 |
| $a^*_G$ | −6 to +6 | −4 to +3 | −3 to +2 |
| $b^*_G$ | −30 to +20 | −25 to +10 | −20 to +10 |
| $R_F Y$ (film side): | 8–50% | 8–40% | 12–35% |
| $L^*_F$ | 34–76 | 37–70 | 41–65 |
| $a^*_F$ | −9 to +9 | −6 to +6 | −5 to +5 |
| $b^*_F$ | −40 to +40 | −30 to +30 | −20 to +30 |
| $T_{sol}$ (TS %): | 5–50% | 5–30% | 5–25% |
| SC: | <=0.5 | <=0.45 | <=0.40 |
| SHGC: | <=0.45 | <=0.43 | <=0.35 |
| $T_{UV}$: | <=40% | <=35% | <=25% |
| $R_s$ (Ω/sq): | <250 | <150 | <120 |

TABLE 3

Color/Optical Characteristics (after HT; in addition to Table 2)

| | General | Preferred | Most Preferred |
| --- | --- | --- | --- |
| $\Delta E^*_G$ | <=5.0 | <=2.5 | <=2.0 |
| $\Delta E^*_T$ | <=5.0 | <=2.5 | <=2.0 |
| $\Delta a^*_G$ | <=2.0 | <=1.0 | <=0.8 |
| $\Delta b^*_G$ | <=3.0 | <=2.0 | <=0.6 |
| $\Delta L^*_G$ | <=9 | <=3 | <=2 |

Coated articles herein may even have a glass side reflective $\Delta E^*$ value ($\Delta E^*_G$) of no greater than 1.8, or even no greater than 1.5, in certain example embodiments of this invention.

For purposes of example only, a plurality of examples representing different example embodiments of this invention are set forth below.

EXAMPLES

Examples 1–3 were monolithic coated articles (each ultimately annealed and heat treated, although not all embodiments herein need be HT), with the layer stack as shown in FIG. 1. The $Si_3N_4$ layers 2 and 4 in each example were deposited by sputtering a silicon target (doped with about 10% Al) in an atmosphere including nitrogen gas. The $NbCrN_x$ IR reflecting layer 3 in each example was deposited by sputtering in an atmosphere including argon and nitrogen gas. In Example 1, the NbCr sputtering target comprised about 55% Nb and about 45% Cr by weight (about 40/60% atomic); whereas in Examples 2 and 3 the sputtering targets comprised about 88% Nb and about 12% Cr by weight (80/20 atomic %).

For Example 1, the following sputtering process parameters were used in depositing the coating. Line speed is in inches per minute (IPM), and gas (Ar and N) flows were in units of sccm:

TABLE 4

Example 1 Coating Process Parameters

| Layer | Power | Voltage | Line Speed | # Passes | Ar flow | N flow |
|---|---|---|---|---|---|---|
| SiN layer 2: | 2.5 kW | 517 V | 47.1 | 8 | 40 | 55 |
| $NbCrN_x$ layer 3: | 1.0 kW | 465 V | 33 | 2 | 30 | 15 |
| SiN layer 4: | 2.5 kW | 521 V | 45.8 | 2 | 40 | 55 |

For Example 2, the following sputtering process parameters were used in depositing the coating. Again, line speed is in inches per minute (IPM), and gas flows were in units of sccm:

TABLE 5

Example 2 Coating Process Parameters

| Layer | Power | Voltage | Line Speed | # Passes | Ar flow | N flow |
|---|---|---|---|---|---|---|
| SiN layer 2: | 2.5 kW | 510 V | 45.4 | 8 | 40 | 55 |
| $NbCrN_x$ layer 3: | 1.0 kW | 444 V | 30 | 2 | 30 | 12 |
| SiN layer 4: | 2.5 kW | 513 V | 36.6 | 2 | 40 | 55 |

For Example 3, the following sputtering process parameters were used in depositing the coating. Again, line speed is in inches per minute (IPM), and gas flows were in units of sccm:

TABLE 6

Example 3 Coating Process Parameters

| Layer | Power | Voltage | Line Speed | # Passes | Ar flow | N flow |
|---|---|---|---|---|---|---|
| SiN layer 2: | 2.5 kW | 511 V | 61.8 | 2 | 40 | 55 |
| $NbCrN_x$ layer 3: | 1.0 kW | 444 V | 40 | 3 | 30 | 15 |
| SiN layer 4: | 2.5 kW | 508 V | 46.4 | 3 | 40 | 55 |

After being sputtered, Examples 1–3 had the following characteristics after being sputtered (annealed and non-HT, monolithic) (Ill. C, 2 degree observer):

TABLE 7

Characteristics (non-HT)

| Parameter | Ex. 1 | Ex. 2 | Ex. 3 |
|---|---|---|---|
| $T_{vis}$ (TY) (transmissive): | 22.0% | 23.3% | 23.0% |
| $a^*_T$ | -1.1 | -1.6 | -1.4 |
| $b^*_T$ | 0.1 | -3.4 | -9.9 |
| $L^*_T$ | 54.0 | 55.4 | 55.1 |
| $R_GY$ (glass side refl. %): | 18.7% | 18.8% | 28.9% |
| $a^*_G$: | -1.8 | -1.2 | -1.5 |
| $b^*_G$: | -17.2 | -16.5 | 0.5 |
| $L^*_G$: | 50.3 | 50.5 | 60.7 |
| $R_FY$ (film side refl. %): | 31.0% | 27.9% | 20.3% |
| $a^*_F$: | 0.9 | 1.7 | 2.3 |
| $b^*_F$: | 22.0 | 31.2 | 27.9 |
| $L^*_F$: | 62.5 | 59.8 | 52.2 |
| $T_{sol}$ (TS): | n/a | 17.5% | 16.4% |
| Shading Coefficient (SC): | n/a | 0.41 | 0.38 |
| SHGC: | n/a | 0.35 | 0.32 |
| $T_{uv}$ (UV transmission): | n/a | 19% | 23% |
| $R_s$ (sheet resistance; ohms/sq.): | 113 | 106 | 111 |

Each of Examples 1–3 had a layer stack as follows, set forth in Table 8. The thicknesses and stoichiometries listed below in Table 8 for the Examples 1–3 are approximations and are not exact. The coating 5 for each Example is shown in FIG. 1, and thus includes layers 2, 3 and 4. The glass substrates were clear and about 6 mm thick in each Example.

TABLE 8

Coatings in Examples

| Example 1: | Glass/$Si_3N_4$(840 Å)/$NbCrN_x$(230 Å)/$Si_3N_4$(220 Å) |
|---|---|
| Example 2: | Glass/$Si_3N_4$(870 Å)/$NbCrN_x$(240 Å)/$Si_3N_4$(270 Å) |
| Example 3: | Glass/$Si_3N_4$(160 Å)/$NbCrN_x$(225 Å)/$Si_3N_4$(320 Å) |

After being sputter coated, the coated article of Example 1 was heat treated for 10 minutes at about 625 degrees C. Table 9 below sets forth certain color stability characteristics of Example 1 upon/after heat treatment (HT).

TABLE 9

Glass Side Reflective Color Stability Upon HT

| Parameter | Example 1 |
|---|---|
| $\Delta E^*_G$: | 1.0 |

As can be seen from Table 9, Example 1 was characterized by an excellent glass side reflective $\Delta E^*$ value (the lower the better). This low value illustrates how little the glass side reflective optical characteristics of the coating changed upon the heat treatment. This is indicative of superior stability upon heat treatment (e.g., thermal tempering or the like). For purposes of comparison, consider the following layer stack: glass/$Si_3N_4$/NiCr/$Si_3N_4$, which has a glass side reflective $\Delta E^*$ value of above 5.0 after heat treatment (HT) at 625 degrees C. for ten minutes. Example 1 above clearly illustrates the comparative advantage of using niobium chromium nitride, as opposed to NiCr, for the IR reflecting layer. A much lower glass side reflective $\Delta E^*$ value is achievable using niobium chromium nitride. Moreover, durability may also be improved as explained above.

Certain terms are prevalently used in the glass coating art, particularly when defining the properties and solar management characteristics of coated glass. Such terms are used herein in accordance with their well known meaning. For example, as used herein:

Intensity of reflected visible wavelength light, i.e. "reflectance" is defined by its percentage and is reported as $R_xY$ (i.e. the Y value cited below in ASTM E-308-85), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides.

Color characteristics are measured and reported herein using the CIE LAB a*, b* coordinates and scale (i.e. the CIE a*b* diagram, Ill. CIE-C, 2 degree observer). Other similar coordinates may be equivalently used such as by the subscript "h" to signify the conventional use of the Hunter Lab Scale, or Ill. CIE-C, $10°$ observer, or the CIE LUV u*v* coordinates. These scales are defined herein according to ASTM D-2244–93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by 10 Using the CIE System" and/or as reported in IES LIGHTING HANDBOOK 1981 Reference Volume.

The terms "emittance" and "transmittance" are well understood in the art and are used herein according to their well known meaning. Thus, for example, the terms visible light transmittance (TY), infrared radiation transmittance, and ultraviolet radiation transmittance ($T_{uv}$) are known in the art. Total solar energy transmittance (TS) is then usually characterized as a weighted average of these values from 300 to 2500 nm (UV, visible and near IR). With respect to these transmittances, visible transmittance (TY), as reported herein, is characterized by the standard CIE Illuminant C, 2 degree observer, technique at 380–720 nm; near-infrared is 720–2500 nm; ultraviolet is 300–380 nm; and total solar is 300–2500 nm. For purposes of emittance, however, a particular infrared range (i.e. 2,500–40,000 nm) is employed.

Visible transmittance can be measured using known, conventional techniques. For example, by using a spectrophotometer, such as a Perkin Elmer Lambda 900 or Hitachi U4001, a spectral curve of transmission is obtained. Visible transmission is then calculated using the aforesaid ASTM 308/2244-93 methodology. A lesser number of wavelength points may be employed than prescribed, if desired. Another technique for measuring visible transmittance is to employ a spectrometer such as a commercially available Spectrogard spectrophotometer manufactured by Pacific Scientific Corporation. This device measures and reports visible transmittance directly. As reported and measured herein, visible transmittance (i.e. the Y value in the CIE tristimulus system, ASTM E-308-85) uses the Ill. C., 2 degree observer.

Another term employed herein is "sheet resistance". Sheet resistance ($R_s$) is a well known term in the art and is used herein in accordance with its well known meaning. It is here reported in ohms per square units. Generally speaking, this term refers to the resistance in ohms for any square of a layer system on a glass substrate to an electric current passed through the layer system. Sheet resistance is an indication of how well the layer or layer system is reflecting infrared energy, and is thus often used along with emittance as a measure of this characteristic. "Sheet resistance" may for example be conveniently measured by using a 4-point probe ohmmeter, such as a dispensable 4-point resistivity probe with a Magnetron Instruments Corp. head, Model M-800 produced by Signatone Corp. of Santa Clara, Calif.

The terms "heat treatment" and "heat treating" as used herein mean heating the article to a temperature sufficient to enabling thermal tempering, bending, and/or heat strengthening of the glass inclusive article. This definition includes, for example, heating a coated article to a temperature of at least about 580 or 600 degrees C. for a sufficient period to enable tempering. In some instances, the HT may be for at least about 4 or 5 minutes.

Once given the above disclosure many other features, modifications and improvements will become apparent to the skilled artisan. Such other features, modifications and improvements are therefore considered to be a part of this invention, the scope of which is to be determined by the following claims:

What is claimed is:

1. A coated article including a layer system supported by a glass substrate, the layer system comprising:
    a first layer comprising silicon nitride;
    a layer comprising niobium chromium nitride provided on the glass substrate over the first layer comprising silicon nitride;
    a second layer comprising silicon nitride provided on the glass substrate over the layer comprising niobium chromium nitride; and
    wherein the layer comprising niobium chromium nitride is sandwiched between and contacts each of the first and second layers comprising silicon nitride.

2. The coated article of claim 1, wherein the coated article has a ΔE* value (glass side reflective) of no greater than 3.0 after and/or due to heat treatment.

3. The coated article of claim 1, wherein the coated article has a visible transmission of from 8 to 80%.

4. The coated article of claim 1, wherein the coated article has a ΔE* value (glass side reflective) of no greater than 2.5 after and/or due to heat treatment.

5. The coated article of claim 1, wherein the coated article has a ΔE* value (glass side reflective) of no greater than 2.0 after and/or due to heat treatment.

6. The coated article of claim 1, wherein the layer system consists essentially of the first and second layers comprising silicon nitride and the layer comprising niobium chromium nitride.

7. The coated article of claim 1, wherein the coated article has no metallic infrared (IR) reflecting layer.

8. The coated article of claim 1, wherein the coated article comprises an IG window unit, a monolithic window, or a laminated window.

9. A coated article including a layer system supported by a glass substrate, the layer system comprising:
    a first dielectric layer;
    a layer comprising niobium chromium (NbCr) provided on the glass substrate over the first dielectric layer;
    a second dielectric layer provided on the glass substrate over the layer comprising niobium chromium;
    wherein the layer comprising niobium chromium is sandwiched between and contacts each of the first and second dielectric layers; and
    wherein the layer system consists essentially of the first and second dielectric layers and the layer comprising niobium chromium.

10. The coated article of claim 9, wherein the layer comprising niobium chromium is metallic.

11. The coated article of claim 9, wherein the layer comprising niobium chromium is at least partially nitrided.

12. The coated article of claim 9, wherein the layer comprising niobium chromium is substantially free of any oxide.

13. The coated article of claim 9, wherein the coated article has a ΔE* value (glass side reflective) of no greater than 3.0 after and/or due to heat treatment.

14. The coated article of claim 9, wherein the coated article has a visible transmission of from 8 to 80%.

15. The coated article of claim 9, wherein the coated article has a ΔE* value (glass side reflective) of no greater than 2.5 after and/or due to heat treatment.

16. The coated article of claim 9, wherein the coated article has a ΔE* value (glass side reflective) of no greater than 2.0 after and/or due to heat treatment.

17. The coated article of claim 9, wherein at least one of the dielectric layers comprises silicon nitride and includes aluminum and/or stainless steel.

18. The coated article of claim 9, wherein the coated article has no metallic infrared (IR) reflecting layer.

19. The coated article of claim 9, wherein the coated article comprises an IG window unit, a monolithic window, or a laminated window.

20. A coated article including a coating supported by a glass substrate, the coating comprising:

a first dielectric layer;

a layer comprising NbCr and/or a nitride of NbCr;

a second dielectric layer, wherein said layer comprising NbCr and/or a nitride of NbCr is located between at least the first and second dielectric layers; and wherein said layer comprising NbCr and/or a nitride of NbCr is the primary infrared (IR) reflecting layer of the coating and does not contact any metallic infrared reflecting layer of Ag.

21. The coated article of claim 20, wherein the layer comprising NbCr and/or a nitride of NbCr is in contact with each of said dielectric layers.

22. The coated article of claim 20, wherein the coated article has a visible transmission of from 10–30%.

23. The coated article of claim 20, wherein the layer comprising NbCr and/or a nitride of NbCr is substantially free of any oxide.

24. The coated article of claim 23, wherein the coated article is not heat treated.

25. The coated article of claim 20, wherein the coated article has a ΔE* value (glass side reflective) of no greater than 3.0 after and/or due to heat treatment.

26. The coated article of claim 20, wherein the coated article has a visible transmission of from 8 to 80%.

27. The coated article of claim 20, wherein the coated article has a ΔE* value (glass side reflective) of no greater than 2.0 after and/or due to heat treatment.

28. The coated article of claim 20, wherein the coating consists essentially of the first and second dielectric layers and the layer comprising NbCr and/or a nitride of NbCr.

29. The coated article of claim 20, wherein at least one of the dielectric layers comprises silicon nitride.

30. The coated article of claim 20, wherein the coated article has no Ag layer.

31. The coated article of claim 20, wherein the coated article comprises an IG window unit, a monolithic window, or a laminated window.

32. A coated article including a coating supported by a glass substrate, the coating comprising:

a first dielectric layer;

a layer comprising NbCr and/or a nitride of NbCr;

a second dielectric layer, wherein said layer comprising NbCr an or a nitride of NbCr is located between at least the first and second dielectric layers;

wherein said layer comprising NbCr and/or a nitride of NbCr does not contact any metallic infrared (IR) reflecting layer of Ag; and wherein the layer comprising NbCr and/or a nitride of NbCr is nitrided of NbCr is nitrided and is represented by $(Nb+Cr)_x N_y$, where the ratio y/x is from 0.2 to 0.9.

33. The coated article of claim 32, wherein the ratio y/x is from 0.4 to 0.7.

34. A coated article including a coating supported by a glass substrate, the coating comprising:

a first dielectric layer;

a layer comprising a nitride of NbCr;

a second dielectric layer, wherein said layer comprising the a nitride of NbCr is located between at least the first and second dielectric layers.

35. The coated article of claim 34, wherein said layer comprising the nitride of NbCr does not contact any metallic infrared (IR) reflecting layer of Ag.

36. A coated article including a layer system supported by a glass substrate, the layer system comprising:

a layer comprising niobium chromium (NbCr) provided on the glass substrate;

a dielectric layer provided on the glass substrate over the layer comprising niobium chromium; and wherein the layer comprising NbCr is the primary infrared (IR) reflecting layer of the coating and does not contact any layer of Ag.

37. The coated article of claim 36, wherein the layer comprising niobium chromium is metallic.

38. The coated article of claim 36, wherein the layer comprising niobium chromium is at least partially nitrided.

39. The coated article of claim 36, wherein a dielectric layer is provided between the substrate and the layer comprising niobium chromium.

40. The coated article of claim 36, wherein the coated article has a ΔE* value (glass side reflective) of no greater than 3.0 after and/or due to heat treatment.

41. The coated article of claim 36, wherein the coated article has a ΔE* value (glass side reflective) of no greater than 2.5 after and/or due to heat treatment.

42. The coated article of claim 36, wherein the coated article comprises an IG window unit, a monolithic window, or a laminated window.

43. The coated article of claim 34, wherein the coated article has a ΔE* value (glass side reflective) of no greater than 3.0 after and/or due to heat treatment.

44. The coated article of claim 34, wherein the coated article has a visible transmission of from 8 to 80%.

45. The coated article of claim 34, wherein the coated article has a ΔE* value (glass side reflective) of no greater than 2.0 after and/or due to heat treatment.

* * * * *